(12) United States Patent
Huang (10) Patent No.: US 8,396,244 B2
(45) Date of Patent: Mar. 12, 2013

(54) ELECTROMAGNETIC VIBRATOR AND PRODUCING METHOD

(75) Inventor: Hsin Min Huang, Ningbo (CN)

(73) Assignee: Tang Band Industries Co., Ltd., Ningbo, Zhejiang (CN)

( * ) Notice: Subject to any disclaimer, the term of this patent is extended or adjusted under 35 U.S.C. 154(b) by 584 days.

(21) Appl. No.: 12/657,197

(22) Filed: Jan. 14, 2010

(65) Prior Publication Data

US 2010/0220888 A1 Sep. 2, 2010

(30) Foreign Application Priority Data

Feb. 27, 2009 (CN) .......................... 2009 1 0105684

(51) Int. Cl.
*H04R 25/00* (2006.01)
(52) U.S. Cl. ........................................ 381/398; 345/386
(58) Field of Classification Search .................. 381/150, 381/345, 347, 348, 396, 398, 430, 432, 433; 310/25, 28, 43
See application file for complete search history.

(56) References Cited

U.S. PATENT DOCUMENTS

| | | | | |
|---|---|---|---|---|
| 6,611,605 B2 * | 8/2003 | Kim | ........................... | 381/406 |
| 7,936,896 B2 * | 5/2011 | Horigome et al. | ........... | 381/397 |
| 7,974,433 B2 * | 7/2011 | Andersen et al. | ............. | 381/398 |
| 8,090,139 B2 * | 1/2012 | Reinecke | ....................... | 381/396 |
| 8,110,951 B2 * | 2/2012 | Huang | ............................ | 310/25 |
| 8,129,871 B2 * | 3/2012 | Huang | ............................ | 310/28 |
| 8,175,321 B2 * | 5/2012 | Bryant et al. | .................. | 381/423 |
| 2007/0071274 A1 * | 3/2007 | Andersen et al. | ............. | 381/404 |
| 2007/0081693 A1 * | 4/2007 | Andersen et al. | ............. | 381/423 |
| 2010/0329486 A1 * | 12/2010 | Scheel et al. | ................... | 381/152 |
| 2011/0043056 A1 * | 2/2011 | Huang | ............................ | 310/25 |
| 2011/0064260 A1 * | 3/2011 | Andersen et al. | ............. | 381/430 |

* cited by examiner

*Primary Examiner* — Fan Tsang
*Assistant Examiner* — Phylesha Dabney
(74) *Attorney, Agent, or Firm* — Raymond Y. Chan; David and Raymond Patent Firm (57) ABSTRACT

An electromagnetic vibrator includes an upper basin frame, an induction coil, and a lower basin frame, wherein the upper basin frame includes a supporting frame, a vibration sheet, and a suspension edge element. The vibration sheet and the suspension edge are integrally formed together via mold injecting, so as to achieve variety of style and colors of the speaker. The manufacturing method of the electromagnetic vibrator improves the traditional producing process of a speaker by minimizing the gluing procedure thereof. The machinery equipments replace the traditional manual process. The special coupling structure and unique process of the electromagnetic vibrator also reduce the amount of using glue, so that the manufacturing cost is minimized, the unstability of manually operation process is minimized, the quality and production rate is enhanced, and the process is relatively more environmental friendly.

20 Claims, 9 Drawing Sheets

ELECTROMAGNETIC VIBRATOR AND PRODUCING METHOD

BACKGROUND OF THE PRESENT INVENTION

1. Field of Invention

The present invention relates to an acoustic vibration apparatus, and more particularly to a speaker using electromagnetic force to generate a mechanical vibration for generating a sound and a method thereof.

2. Description of Related Arts

As known by most of the people, the speaker is an electronic sound device for converting an electrical energy to sound energy. There are variety types of speakers. Though the principles of each of the speakers may be different, the speakers generally produce a mechanical vibration to vibrate the surrounding air, so that the air medium is being vibrated to form an electric-force-sound conversion system. Most of the current speakers are electric type loudspeaker. The conventional manufacturing process for making traditional speaker comprises the steps of glue the T iron or U iron, glue a basin frame with a magnetic element, and integrating upper plate, vibration sheet, coil, and the suspension edge etc. Firstly, all the materials are prepared for manually integrating the speaker from lower to upper, and from outside to inside of the speaker. During each of the steps of the manufacturing process, the precise glue for adhesive two or more parts of the materials together to form the speaker. For those relatively high quality speakers, the amount of the glue and the procedure of gluing have strictly requirements and standards. In the chemical view, the bonding via the glue is mostly formed via a Van der War force or Hydrogen bonding force. It is seldom that the bonding via the glue is formed via chemical bonding force, which has stronger bonding force than Van der War force or Hydrogen bonding force, so that the bonding of the parts of speaker via the glue is unstable. After a certain period, the glue tends to be oxidized, so that the parts of the speaker will be easily peeled apart. A variety of manual glue processes are required in lots of the steps of manufacturing speaker. Therefore, the manufacturing method for producing the speaker is complicated and unable to ensure the quality and stability of the products, so as to limit its applications. Traditionally, the glue process has very strict requirements for the viscosity of the glue. For example, the vibration sheet is adhesively mounted at the suspension edge via glue, wherein when a viscosity of the glue is too high, the glue can not be squeezed out of the gluing machine; when the viscosity of the glue is too low, the glue may overflow to decrease the performance of the vibration sheet. The amount and the uniformity also directly affect the quality of the speaker. The stander and procedure of glue process must be strictly followed to ensure the quality. Each of the working procedures may require plurality of specific fixtures for each of the steps. For instances, sound regulatory is adapted for adhesive the coil; magnetic regulation is provided for placing the magnetic element. Therefore, the manufacturing procedures are complicated and needs a considerable amount of workers to manually operate the process. If one of the steps or procedures is failed, the quality of the speaker may be decreased. Therefore, the manufactory may have to write of the entirely speaker. The materials and variety of different glue used for producing the speaker are not able to be recycled to cause the unnecessary waste thereof. The complicated procedures are basically operated manually, so that the production rate is low. Therefore, each batches of the speaker production are not uniformed, the qualities of speakers are not stable, and the passing rate of the quality certificate or quality control of the speakers is low.

According to a China patent of electromagnetic vibrator having a patent number CN201064771Y, which is filed by the same inventor of the present invention, though the electromagnetic vibrator overcame the existing problems of complication procedures of making the speaker, and decreased the manually operation procedures to enhance the production rate and quality passing rate, the speakers manufactured via the method of this China patent is mainly focusing on the extra thin plat type vibrator. The shapes of the speaker are uniformed. The speaker can hardly change the shapes of the outer appearances in order to meet the different applications or requirements.

SUMMARY OF THE PRESENT INVENTION

An object of the present invention is to provide an electromagnetic vibrator, such as a speaker, which comprises an upper basin frame, an induction coil, and a lower basin frame, wherein the upper basin frame comprises a supporting frame, a vibration sheet, and a suspension edge element. The vibration sheet and the supporting frame are placed in a molding tool of the suspension edge element for integrally forming the upper basin frame in a one piece integrated structure by mold injection. In other words, during the operation of the mold injection, the suspension edge element is integrally bonded with the vibration sheet and is integrally coupled at the supporting frame. The mold injecting method of integrally the suspension edge element with the vibration sheet and the supporting frame is used by injecting the injection material via a single center feeding point or multiple feeding points to the molding tool. Therefore, the gaps of the vibration sheet are fed with the suspension edge element to selectively form a plurality of shapes, so as to achieve variety of styles and colors of the appearance of the speakers.

Another object of the present invention is to provide an electromagnetic vibrator, wherein the special bonding structure of the upper basin frame can replace the traditional complicated glue process, so that the method for making the speaker is simplified, so as to minimize the manufacturing cost thereof.

Another object of the present invention is to provide an electromagnetic vibrator, wherein the production rate is enhanced by using machinery equipments for making the speaker to reduce the manual manufacturing process, so that the electromagnetic vibrator can be mass-produced.

Another object of the present invention is to provide a method for making an electromagnetic vibrator, wherein the unstable manual manufacturing process is minimized by conducting the machinery equipments for producing the electromagnetic vibrator. The stable parameters of the machinery equipments increase the product qualification rate.

Accordingly, in order to accomplish the above objectives, the present invention provides an electromagnetic vibrator comprising an upper basin frame, an induction coil, and a lower basin frame.

The upper basin frame comprises a supporting frame, a suspension edge element, and a vibration sheet, wherein the supporting frame has a through opening and two conductive terminals. The through opening is located at a center portion of the supporting frame. The conductive terminals are provided at a bottom side of the supporting frame. The suspension edge element and the vibration sheet are fixedly embedded within the through opening of the supporting frame. In particularly, the vibration sheet is integrally affixed to the supporting frame via the suspension edge element by mold injection of the suspension edge element.

The vibration sheet is preferably a bowl shape, wherein the vibration sheet can be formed in a flat shape, cone shaped, or any other desired shapes.

Furthermore, during the mold injection of the suspension edge element to integrally bond with the vibration sheet, the single center feeding point injecting method is adapted, so that the fluid of the injection material of the suspension edge element is able to be evenly distributed to integrally bond with the supporting frame and the vibration sheet. Therefore, the gaps of the vibration sheet being fed with the suspension edge can form a plurality of petal, plum, or any other streamlined shapes. The mold injecting method also allows adding variety of colors into the fluid material, such as red, yellow, blue, white, and black colorants, to form a plurality of colors of the present invention. The multiple feeding points may also be provided, so that the hollow portion between the vibration sheet and the suspension edge has no other plastic or injecting material. Therefore, the speaker appearance looks like transitional speaker.

The induction coil is fixedly mounted at the upper basin frame, wherein one side of the induction coil is fixedly mounted at the rear side of the vibration sheet. The induction coil further comprises two connection wires electrically connecting to the two conductive terminals at the supporting frame respectively.

The lower basin frame, which is fixedly coupled with the upper basin frame, comprises an electromagnetic unit and a connecting holder, wherein the electromagnetic unit comprises a U-shaped electromagnetic element, a permanent magnet, and a pole panel. The electromagnetic element has an inner surface, wherein the inner surface is configured to form a receiving cavity therewithin. The permanent magnet and the pole panel are received within the receiving cavity orderly. When the permanent magnet and the pole panel are disposed in the receiving cavity of the electromagnetic element, a coil moving cavity is formed between the inner side of the inner surface of the electromagnetic element. One side of the induction coil is received in the coil moving cavity. One side of the connecting holder is affixedly coupled with the electromagnetic element. In particularly, the connecting holder is integrally formed with the electromagnetic element to form a one piece integrated structure by plastic mold injection. The other side of the connecting holder comprises at least one protruding element. A plurality of heat dissipating apertures are provided between the protruding elements, such that when the electromagnetic vibrator is operated, the heat generated therefrom is able to be dissipated via the air flow through the heat dissipating apertures.

Accordingly, the present invention also provides a method for making the electromagnetic vibrator, which comprises the steps of:

(a) placing the conductive terminals in a molding tool of the supporting frame for integrally forming the conductive terminals with the supporting frame via mold to injecting to inject the molding fluid material into the molding tool of the supporting frame;

(b) placing the vibration sheet and the supporting frame in the molding tool of the suspension edge element for integrally forming the upper basin frame by mold injection to inject the fluid material of mold injection of the suspension edge element into the molding tool of the suspension edge element;

(c) placing the permanent magnet and the pole panel into the U-shaped electromagnetic element orderly to form the electromagnetic unit, and then placing the electromagnetic unit into a molding tool of the connecting holder for integrally forming the lower basin frame via mold injection;

(d) affixing one side of the induction coil at the rear side of the vibration sheet, and placing the other side of the induction coil within the receiving cavity of the lower basin frame; and (e) fixedly coupling the upper basin frame with the lower basin frame.

Therefore, the present invention provides an electromagnetic vibrator, which comprises an upper basin frame, an induction coil, and a lower basin frame, wherein the upper basin frame comprises the supporting frame, vibration sheet, and the suspension edge element. The vibration sheet and the supporting frame are placed in a molding tool of the suspension edge for integrally forming therewith to form the upper basin frame by mold injection, so that the speakers are able to form a plurality of shapes and colors. Meanwhile, the method for making the electromagnetic vibrator changes the traditional producing method, wherein the production quality and rate are enhanced by using machinery equipments for making the speaker to reduce the manual process.

These and other objectives, features, and advantages of the present invention will become apparent from the following detailed description, the accompanying drawings, and the appended claims.

DETAILED DESCRIPTION OF THE PREFERRED EMBODIMENT

Figure 1:
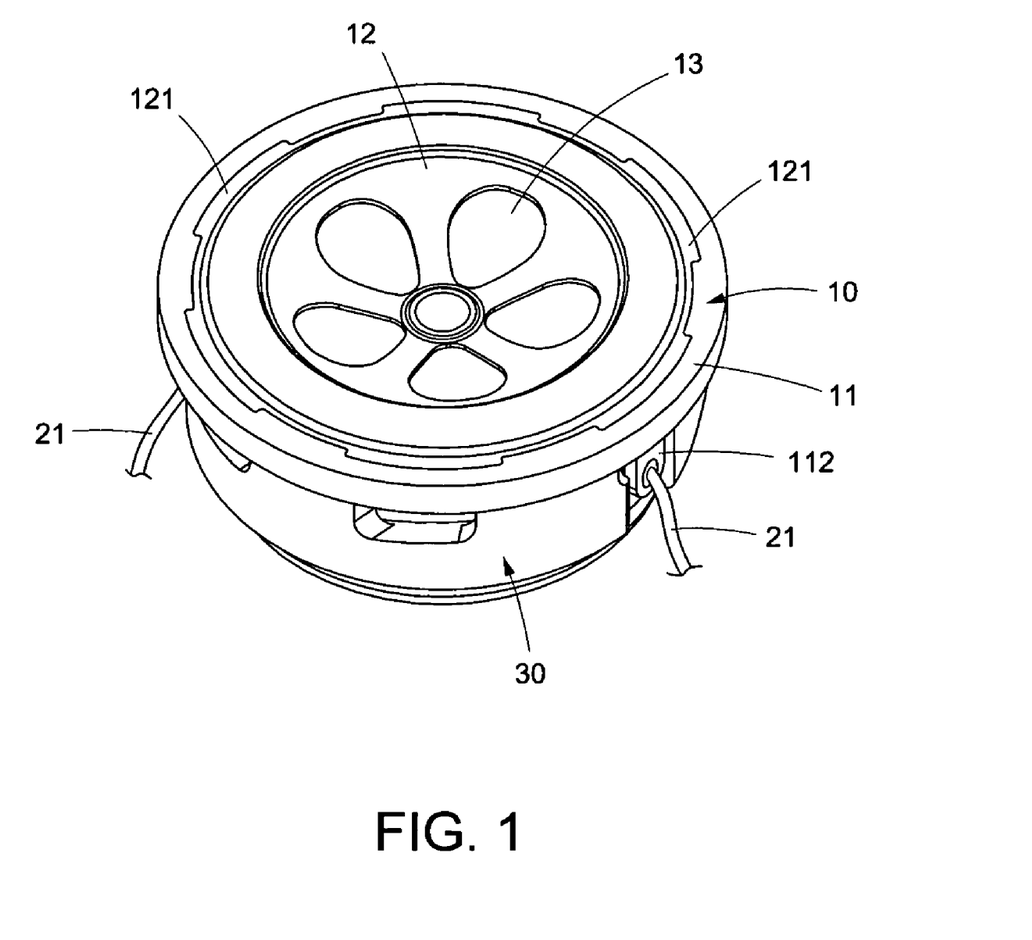
FIG. 1 is a 3-dimentional view of an electromagnetic vibrator for a speaker according to a preferred embodiment of the present invention.
Figure 2:
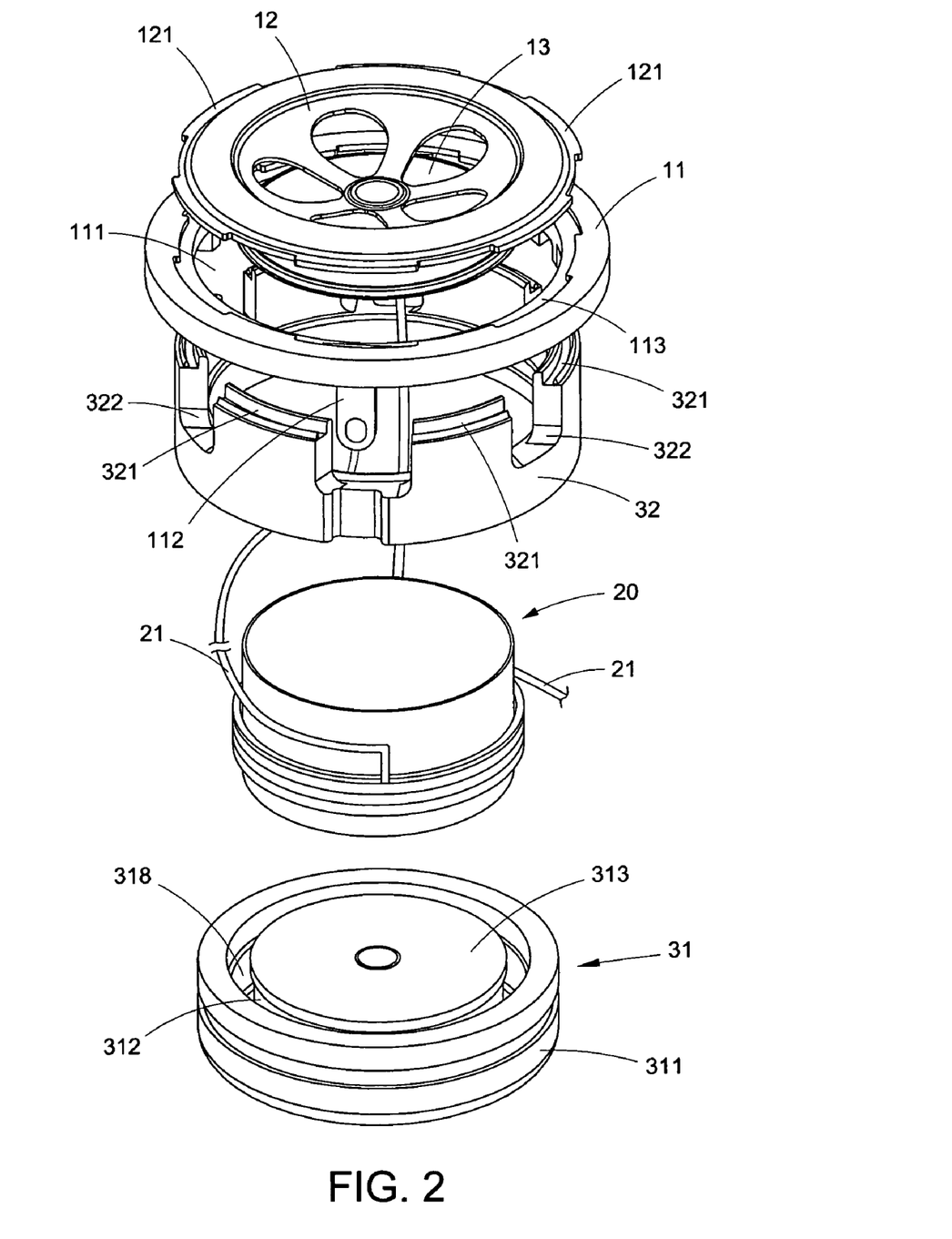
FIG. 2 is an exploded perspective view of the electromagnetic vibrator according to the preferred embodiment of the present invention.
Figure 3:
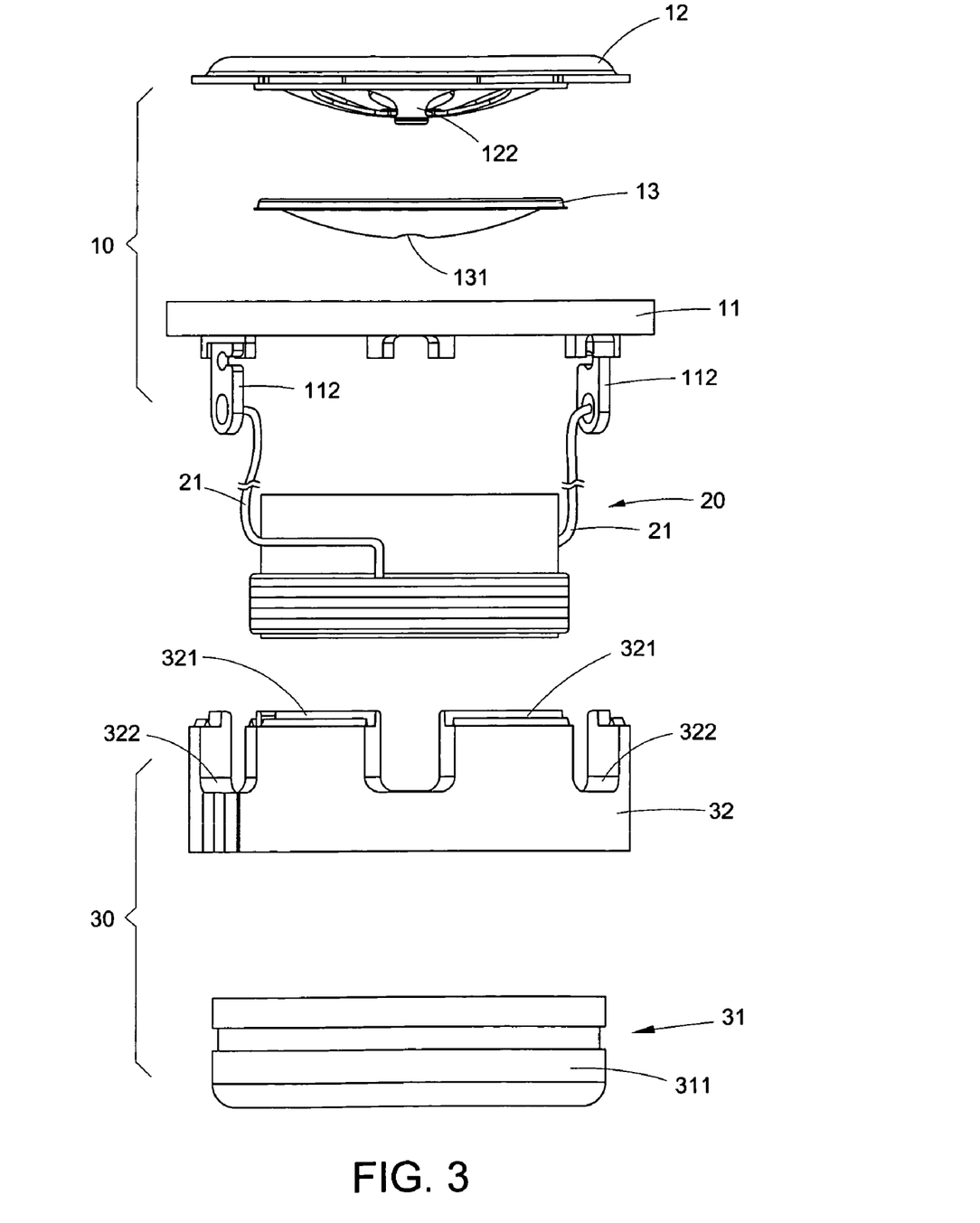
FIG. 3 is a perspective view of the electromagnetic vibrator according to the preferred embodiment of the present invention.
Figure 4:
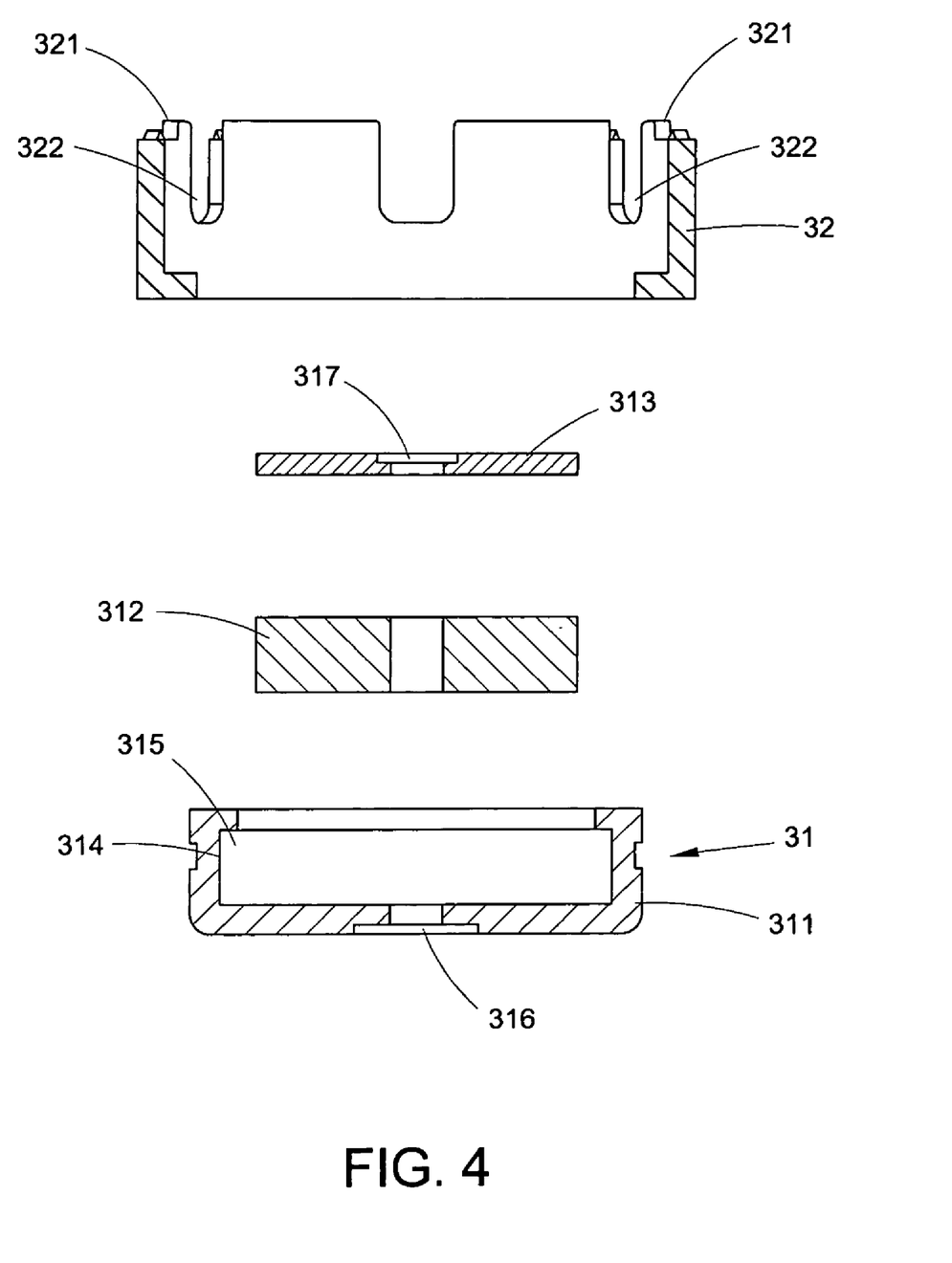
FIG. 4 is an exploded sectional view of a lower basin frame of the electromagnetic vibrator according to the preferred embodiment of the present invention.
Figure 5:
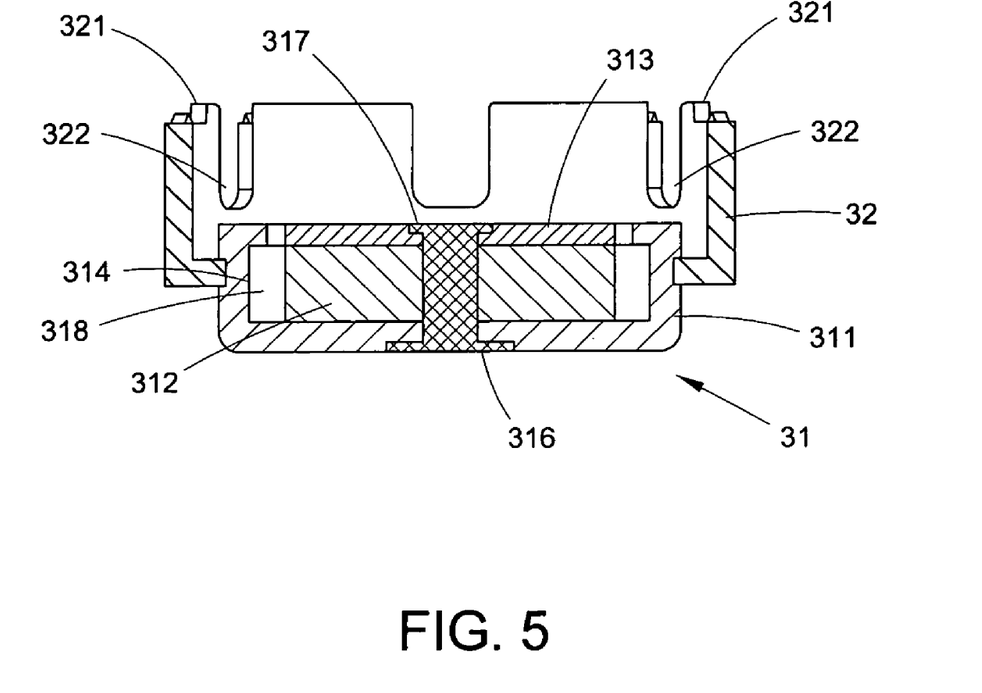
FIG. 5 is a sectional view of the lower basin frame of the electromagnetic vibrator according to the preferred embodiment of the present invention.

Referring to FIGS. 1 to 3 of the drawings, an electromagnetic vibrator specifically for a speaker according to a preferred embodiment of the present invention is illustrated, wherein the electromagnetic vibrator comprises an upper basin frame 10, an induction coil 20, and a lower basin frame 30.

Figure 6:
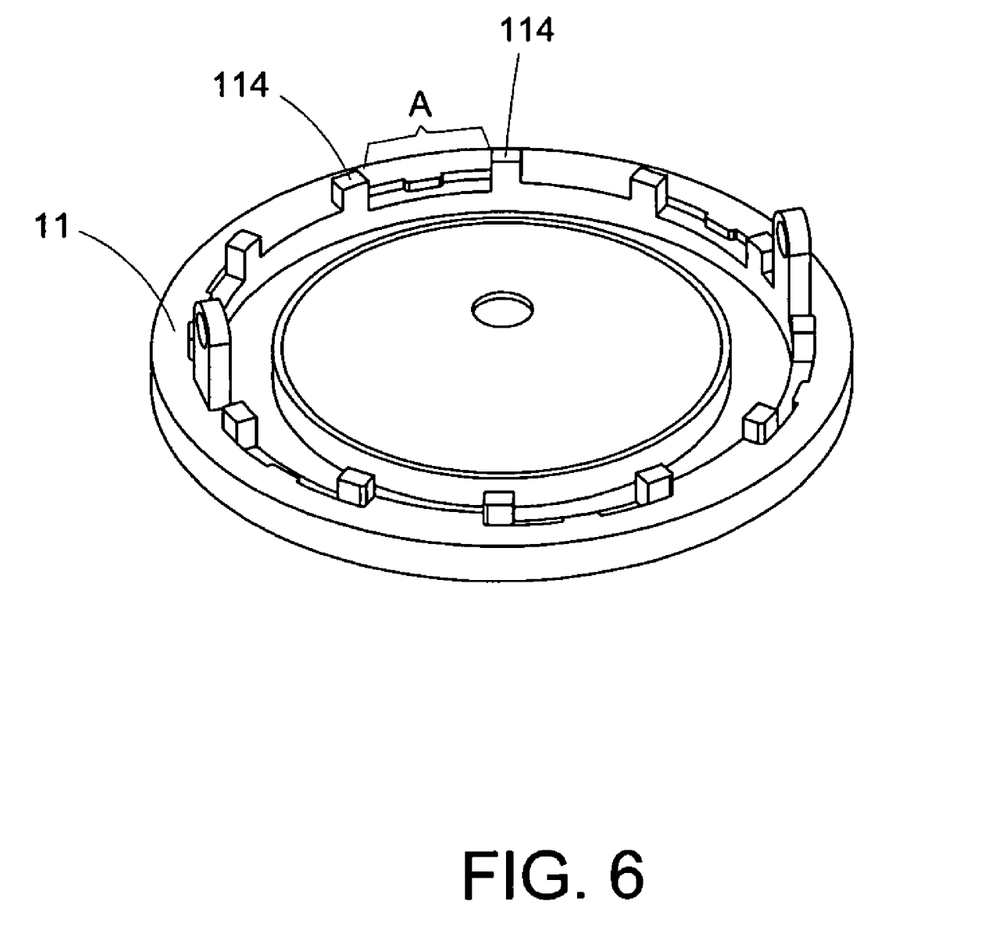
FIG. 6 is a 3-dimentional view of a connecting holder of the electromagnetic vibrator according to the preferred embodiment of the present invention.

As shown in FIGS. 2 to 6, the upper basin frame 10 comprises a supporting frame 11, a suspension edge element 12, and a vibration sheet 13 supported within the suspension edge element 12, wherein the supporting frame 11, having a ring shaped, has a through opening 111, two conductive terminals 112, a plurality of slots 113 and a plurality of first protruding elements 114. The through opening 111 is located at a center portion of the supporting frame 11. The conductive terminals 112 are affixedly provided at a bottom side of the supporting frame 11 in an integrated structure. The slots 113 are spacedly located at the supporting frame 11 at a position that the slots 113 are spacedly formed at a peripheral edge of the through opening 111. As shown in FIG. 6, the first protruding elements 114 are spacedly provided at the bottom peripheral edge of the supporting frame 11 at a position that the first protruding elements 114 are spacedly formed at the peripheral edge of the through opening 111 at the bottom side of the supporting frame 11. Accordingly, the first protruding elements 114 are spacedly formed at the supporting frame 11 that every two of the neighboring first protruding elements 114 are preferably separated at a distance A. The suspension edge element 12 and the vibration sheet 13 are mounted at the through opening 111 of the supporting frame 11 at a position that the suspension edge element 12 and the vibration sheet 13 are integrally embedded at the peripheral edge of the through opening 111. Accordingly, the suspension edge element 12 comprises at least a slot element 121 and a feeding hole 122. The slot element 121 of the suspension edge element 12 is interlocked with one of the slots 113 of the supporting frame 11 to retain the suspension edge element 12 within the supporting frame 11. The feeding hole 122 is located at the center portion of the suspension edge element 12 for a fluid material of mold injection flowing therethrough. The vibration sheet 13 is integrally formed with the supporting frame 11 via the mold injection of the suspension edge element 12. The mold injecting method of the vibration sheet 13 and the suspension edge element 12 injects the injection material via a single central feeding point, so that the fluid of the material of the suspension edge element 12 is able to be evenly distributed. Therefore, the gaps between the suspension edge element 12 and the vibration sheet 13 are able to form a plurality of petal, plum, or any other streamlined shapes. The mold injecting method also allows adding variety of colors into the fluid material to form a plurality of colors of the present invention, such that the speaker is able to form variety of styles and colors according to the shape of the molding tool and the added colorants. Thus, the appearances of speaker having the electromagnetic vibrator of the present invention are varied.

Accordingly, the vibration sheet 13 is preferably formed a bowl shape to have a curved surface.

Figure 8:
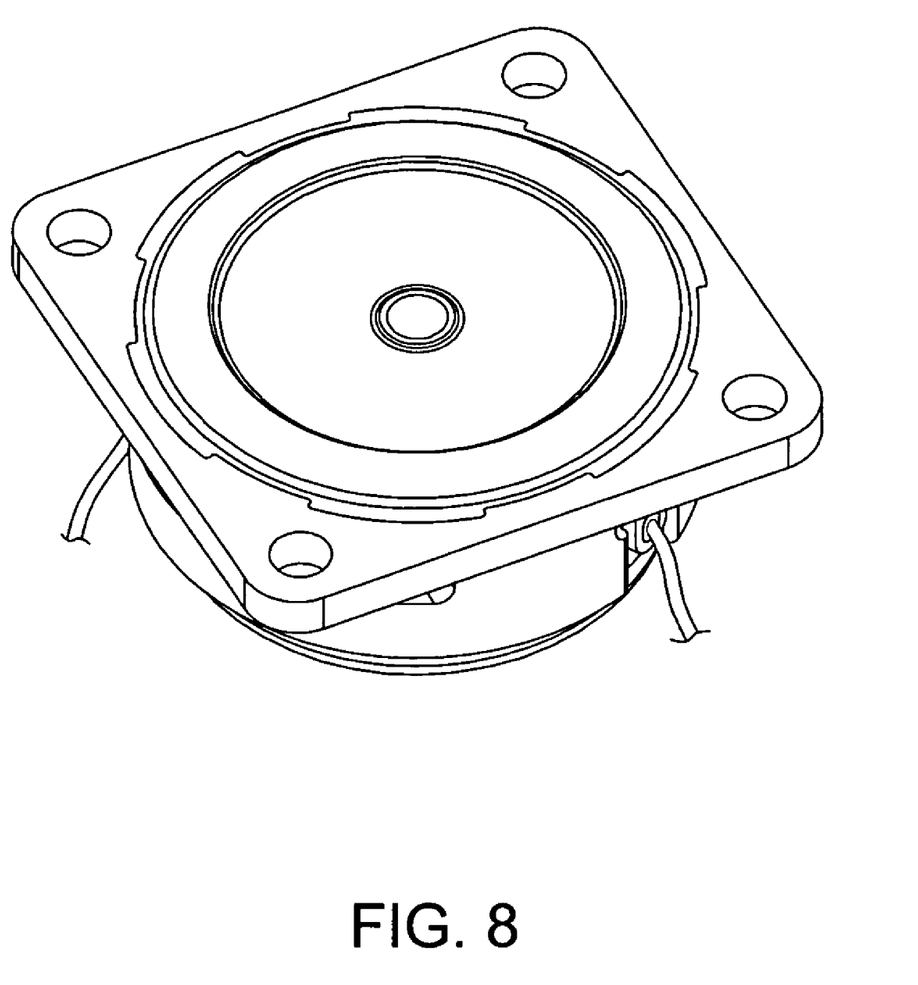
FIG. 8 is a perspective view of another shape of the electromagnetic vibrator according to the above preferred embodiment of the present invention.
Figure 9:
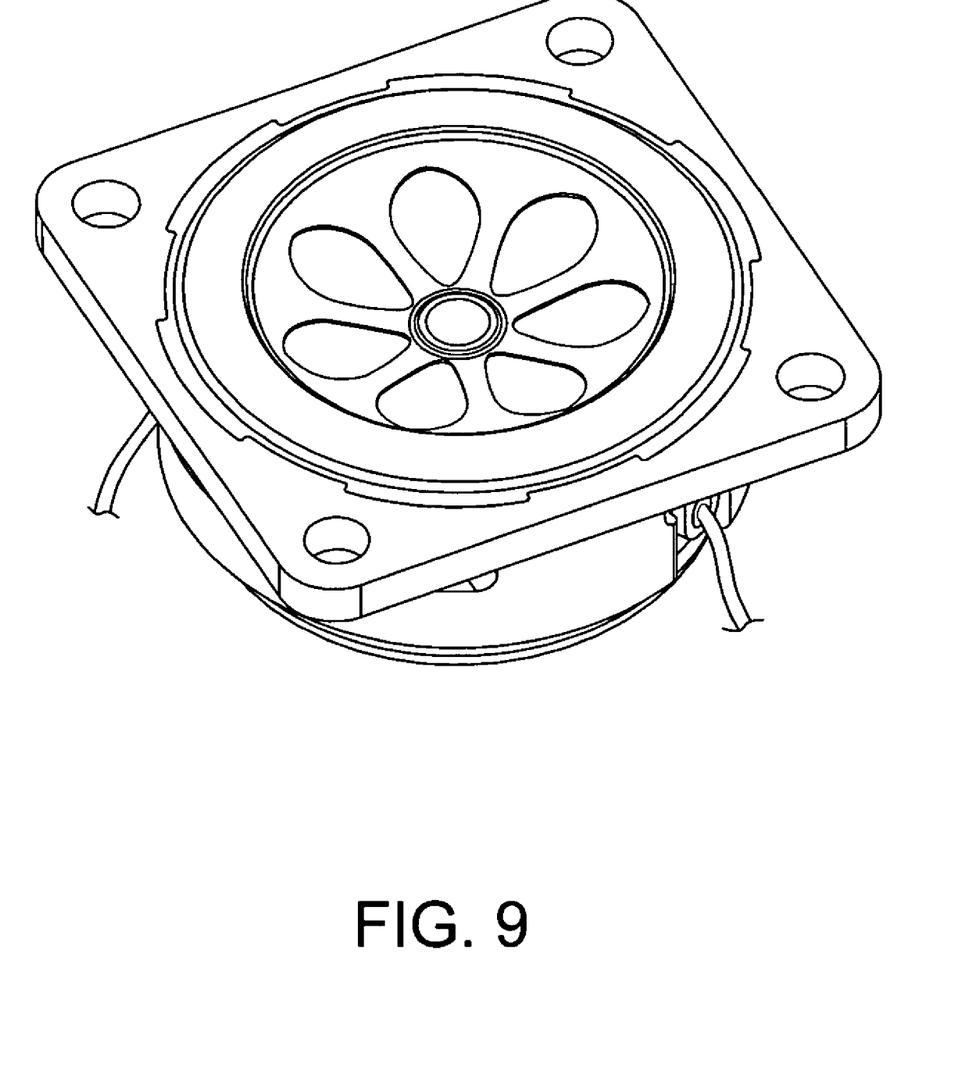
FIG. 9 is still another perspective view of still another shape of the electromagnetic vibrator according to the above preferred embodiment of the present invention.

As shown in FIGS. 8 and 9 of the drawings, the vibration sheet 13 is able to be a flat shape, cone shaped, or any other shapes.

As shown in FIG. 2, the vibration sheet 13 is preferably made by metal. It is appreciated that the vibration sheet 13 can be made a plastic material or other materials. A positioning hole 131 is preferably provided at a central portion of the vibration sheet 13 at a position correspondingly aligned with the feeding hole 122, so that the fluid material of mold injection is able to infiltrate thereinto for mounting the vibration sheet 13 with the suspension edge element 12.

As shown in FIGS. 2 and 3 of the drawings, the induction coil 20 is preferred to fixedly mount at the upper basin frame 10. Furthermore, one side of the induction coil 20 is affixed at a rear side of the vibration sheet 13, wherein two connecting wires 21 of the induction coil 20 are electrically connected to the conductive terminals 112 of the supporting frame 11.

As shown in FIGS. 2 to 5 of the drawings, the lower basin frame 30 is fixedly mounted at the upper basin frame 10. In particularly, one side of the lower basin frame 30 is fixedly connected to the supporting frame 11 of the upper basin frame 10, wherein an electromagnetic unit 31 and a connecting holder 32 for holding and positioning the electromagnetic unit 31 at the lower basin frame 30 are further provided. The electromagnetic unit 31 further comprises an electromagnetic element 311, having a U-shaped cross section and preferably made of iron, a permanent magnet 312 and a pole panel 313. The electromagnetic element 311 has an inner surface 314 configured to form a receiving cavity 315 and a first through hole 316. Accordingly, the first through hole 316 indentedly formed at the bottom side of the electromagnetic element 311 such that when the fluid material of the mold injection is injected, the fluid material is able to penetrate through the first through hole 316 for affixing the electromagnetic unit 31 with the connecting holder 32. The pole panel 313 has a second through hole 317 indentedly formed at one of the top and bottom sides of the pole panel 313, wherein the second through hole 317 is coaxially aligned with the first through hole 316 of the electromagnetic element 311, such that during the mold injecting, the fluid material is able to penetrate through the first and second through holes 316, 317 to integrally affix the electromagnetic element 311, the permanent magnet 312, and the pole panel 313 together. When the permanent magnet 312 and the pole panel 313 are disposed in the receiving cavity 315 of the electromagnetic element 311, a coil moving cavity 318 is formed between the inner side of the inner surface 314 of the electromagnetic element 311 and the outer sides of the permanent magnet 312 and the pole panel 313. Accordingly, the induction coil 20 is movably disposed at the coil moving cavity 318.

One side of the connecting holder 32 is integrally connected to the electromagnetic unit 31 preferably via mold injection method, and the other side of the connecting holder 32 is preferably connected to the corresponding side of the supporting frame 11 of the upper basin frame 10 preferably via ultrasonic connection, rotational interlocking connection, hot-melt connection, rivet connection, or screw connection etc. A plurality of second protruding elements 321 are provided at a peripheral edge of the corresponding side of the connecting holder 32, wherein every two of the neighboring second protruding elements 321 at the upper peripheral edge of the connecting holder 32 are separated at the distance A corresponding to the distance between two first protruding elements 114 such that the second protruding elements 321 are fittingly interlocked with the first protruding elements 114 respectively. Therefore, when the upper basin frame 10 and the lower basin frame 30 are connecting therewith via the ultrasonic, hot melt, or other methods, the connecting between the upper and lower basin frames 10, 30 are not dislocated due to the mechanically vibration. A plurality of heat dissipating apertures 322 are provided at the peripheral edge of the lower basin frame 30 at a position that each of the heat dissipating apertures 322 is located between any two neighboring second protruding elements 321, such that when the electromagnetic vibrator of the speaker is working, the heat generated from the lower basin frame 30 within the receiving cavity is able to be dissipated via the air flow through the heat dissipating apertures 322.

Accordingly, the present invention further provides a method of manufacturing the electromagnetic vibrator, which comprises the steps of:

(a) placing the conductive terminals 112 in a molding tool of the supporting frame 11 for integrally forming the conductive terminals 112 with the supporting frame 11 via mold injecting to inject the molding fluid material, preferably plastic, into the molding tool of the supporting frame 11;

(b) placing the vibration sheet 13 and the supporting frame 11 in the molding tool of the suspension edge element 12 for integrally forming the upper basin frame 10 in a glue-less manner by mold injection to inject the fluid material of mold injection of the suspension edge element 12 into the molding tool of the suspension edge element 12;

(c) placing the permanent magnet 312 and the pole panel 313 into the electromagnetic element 311 orderly to form the electromagnetic unit 31 that the permanent magnet 312 is firstly disposed in the electromagnetic element 311 and the pole panel 313 is disposed on the permanent magnet 312, and then placing the electromagnetic unit 31 into a molding tool of the connecting holder 32 for integrally forming therewith via molding injection to form the integrated lower basin frame 30;

(d) affixing one side of the induction coil 20 at the rear side of the vibration sheet 13, and placing the other side of the induction coil 20 within the coil moving cavity 318 of the lower basin frame 30 such that when the electromagnetic unit 31 is electromagnetically inducted with the induction coil 20, a vibration force is generated to the vibration sheet; and (e) fixedly coupling the upper basin frame 10 with the lower basin frame 30.

More specifically, the upper basin frame 10 and the lower basin frame 30 are preferably coupled with each other via the ultrasonic method.

More specifically, the upper basin frame 10 and the lower basin frame 30 are preferably coupled with each other via rotational interlocking connection.

More specifically, the upper basin frame 10 and the lower basin frame 30 are preferably coupled with each other via the hot-melt connection.

More specifically, the upper basin frame 10 and the lower basin frame 30 are preferably coupled with each other via the rivet connection.

More specifically, the upper basin frame 10 and the lower basin frame 30 are preferably coupled with each other via screw connection.

More specifically, the lower basin frame 30 can be coupled with the upper basin frame 10 via the traditional method.

Figure 7:
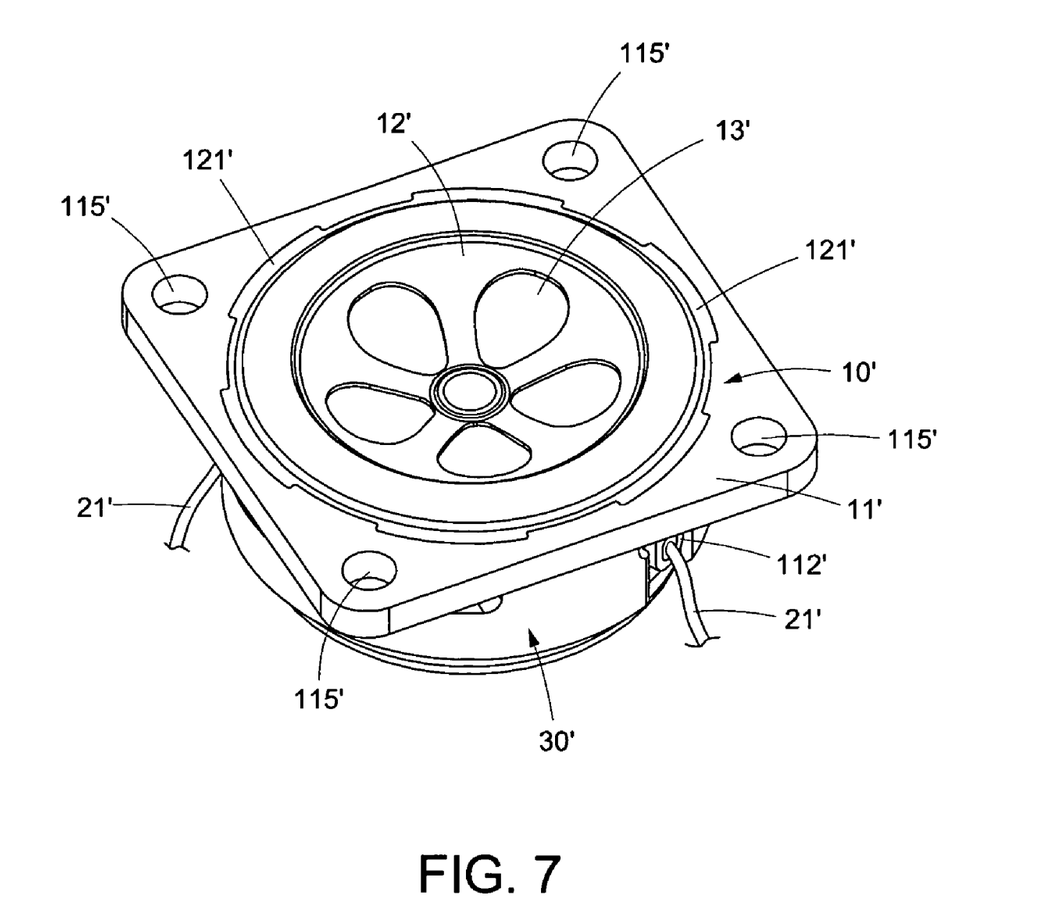
FIG. 7 is a 3-dimentional view of an electromagnetic vibrator according to another preferred embodiment of the present invention.

Referring to FIG. 7 of the drawings, another preferred embodiment of the present invention illustrates an alternative mode of the above preferred embodiment.

As shown in FIG. 7, a supporting frame 11' of the upper basin frame 10' of an electromagnetic vibrator of a speaker has at least one affixing hole 115' provided at a peripheral edge of the supporting frame 11', so as to conveniently affixing and positioning the speaker.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An electromagnetic vibrator, comprising:
    an upper basin frame, which comprises a supporting frame having a through opening, two conductive terminals, a suspension edge element supported within said through opening of said supporting frame, and a vibration sheet coupled with said suspension edge element, wherein said suspension edge element is mold-injected to integrally bond with said supporting frame and said vibration sheet so as to form said upper basin frame in a one piece integrated structure in a glue-less manner;
    an induction coil having one side coupled at said vibration sheet and two connecting wires electrically connected to said conductive terminals respectively;
    a lower basin frame, which is coupled with said upper basin frame to hold said induction coil within said lower basin frame, comprising an electromagnetic unit electromagnetically inducted with said induction coil to generate a vibration force to said vibration sheet.

2. The electromagnetic vibrator, as recited in claim 1, wherein said vibration sheet has a positioning hole aligning with a feeding hole of said suspension edge element such that an injection material is fed to said positioning hole through said feeding hole to form said suspension edge element so as to integrally bond with said vibration sheet and said supporting frame.

3. The electromagnetic vibrator, as recited in claim 1, wherein said electromagnetic unit comprises an electromagnetic element having a receiving cavity and a permanent magnet disposed within said receiving cavity at a position that an opposed side of said induction coil is movably disposed between an inner side of said receiving cavity and an outer side of said permanent magnet.

4. The electromagnetic vibrator, as recited in claim 2, wherein said electromagnetic unit comprises an electromagnetic element having a receiving cavity and a permanent magnet disposed within said receiving cavity at a position that an opposed side of said induction coil is movably disposed between an inner side of said receiving cavity and an outer side of said permanent magnet.

5. The electromagnetic vibrator, as recited in claim 3, wherein said electromagnetic element, which is made of iron, has a U-shaped cross section and defines said receiving cavity therewithin to receive said permanent magnet, wherein when permanent magnet is disposed in said receiving cavity of said electromagnetic element, a coil moving cavity is formed between said inner side of said electromagnetic element and said outer side of said permanent magnet to receive said corresponding side of said induction coil in said coiling moving cavity.

6. The electromagnetic vibrator, as recited in claim 4, wherein said electromagnetic element, which is made of iron, has a U-shaped cross section and defines said receiving cavity therewithin to receive said permanent magnet, wherein when permanent magnet is disposed in said receiving cavity of said electromagnetic element, a coil moving cavity is formed between said inner side of said electromagnetic element and said outer side of said permanent magnet to receive said corresponding side of said induction coil in said coiling moving cavity.

7. The electromagnetic vibrator, as recited in claim 4, wherein said electromagnetic unit further comprises a pole panel coupling with said permanent magnet within said receiving cavity, wherein said pole panel has a second through hole aligning with a first through hole of said electromagnetic element such that said permanent magnet is integrally bonded between said electromagnetic element and said pole panel by mold injection through said first and second through holes.

8. The electromagnetic vibrator, as recited in claim 6, wherein said electromagnetic unit further comprises a pole panel coupling with said permanent magnet within said receiving cavity, wherein said pole panel has a second through hole aligning with a first through hole of said electromagnetic element such that said permanent magnet is integrally bonded between said electromagnetic element and said pole panel by mold injection through said first and second through holes.

9. The electromagnetic vibrator, as recited in claim 4, wherein said lower basin frame further comprises a connecting holder having one side integrally connected to said electromagnetic unit by mold injection and an opposed side connecting to said supporting frame of said upper basin frame by ultrasonic connection.

10. The electromagnetic vibrator, as recited in claim 8, wherein said lower basin frame further comprises a connecting holder having one side integrally connected to said electromagnetic unit by mold injection and an opposed side connecting to said supporting frame of said upper basin frame by ultrasonic connection.

11. The electromagnetic vibrator, as recited in claim 9, wherein said supporting frame further comprises a plurality of first protruding elements spacedly provided at a bottom side of said supporting frame, wherein said connecting holder comprises a plurality of second protruding elements interlocking with said first protruding elements respectively to couple said lower basin frame with said upper basin frame.

12. The electromagnetic vibrator, as recited in claim 10, wherein said supporting frame further comprises a plurality of first protruding elements spacedly provided at a bottom side of said supporting frame, wherein said connecting holder comprises a plurality of second protruding elements interlocking with said first protruding elements respectively to couple said lower basin frame with said upper basin frame.

13. The electromagnetic vibrator, as recited in claim 1, wherein said lower basin frame further comprises a plurality of heat dissipating apertures for dissipating heat lower basin frame.

14. The electromagnetic vibrator, as recited in claim 12, wherein said lower basin frame further comprises a plurality of heat dissipating apertures for dissipating heat lower basin frame.

15. A method of manufacturing an electromagnetic vibrator, comprising the steps of:
 (a) placing a vibration sheet and a supporting frame in a suspension edge element molding tool;
 (b) mold-injecting an injection material into said suspension edge element molding tool to form a suspension edge element that said suspension edge element is integrally bonded with said vibration sheet and said supporting frame to form an upper basin frame;
 (c) placing a permanent magnet and a pole panel into an electromagnetic element orderly to form an electromagnetic unit, wherein said permanent magnet, said pole panel, and said electromagnetic element is mold-injected to integrally form an one piece structure of said electromagnetic unit so as to form a lower basin frame; and
 (d) affixing one side of an induction coil at a rear side of said vibration sheet and placing another side of said induction coil within a coil moving cavity of said electromagnetic unit, wherein two connecting wires of said induction coil are electrically connected to two conductive terminals at said supporting frame respectively, such that when said electromagnetic unit is electromagnetically inducted with said induction coil, a vibration force is generated to said vibration sheet.

16. The method as recited in claim 15 wherein, in the step (b), said vibration sheet has a positioning hole aligning with a feeding hole of said suspension edge element such that said injection material is fed to said positioning hole through said feeding hole to form said suspension edge element so as to integrally bond with said vibration sheet and said supporting frame.

17. The method as recited in claim 16 wherein, in the step (c), said electromagnetic element has a U-shaped cross section and defines said receiving cavity therewithin to receive said permanent magnet and said pole panel orderly, wherein when permanent magnet is disposed in said receiving cavity of said electromagnetic element, said coil moving cavity is formed between said inner side of said electromagnetic element and said outer side of said permanent magnet to receive said corresponding side of said induction coil in said coiling moving cavity.

18. The method, as recited in claim 17, wherein the step (d) further comprises a step of providing a connecting holder to couple with said electromagnetic unit and said supporting frame, wherein said connecting holder has one side integrally connected to said electromagnetic unit by mold injection and an opposed side connecting to said supporting frame by ultrasonic connection.

19. The method as recited in claim 18, before the step (a) further comprising a step of integrally affixing said conductive terminals at said supporting frame by mold injection of said supporting frame.

20. The method, as recited in claim 19, wherein the step (d) further comprises a step of affixing said lower basin frame to said upper basin frame, wherein said supporting frame further comprises a plurality of first protruding elements spacedly provided at a bottom side of said supporting frame, wherein said connecting holder comprises a plurality of second protruding elements interlocking with said first protruding elements respectively to couple said lower basin frame with said upper basin frame.

\* \* \* \* \*